(12) United States Patent
Kawasaki et al.

(10) Patent No.: US 9,334,964 B2
(45) Date of Patent: *May 10, 2016

(54) GLAND PACKING

(71) Applicant: Nippon Pillar Packing Co., Ltd., Osaka-shi, Osaka (JP)

(72) Inventors: Takashi Kawasaki, Osaka (JP); Hiroki Hayashi, Osaka (JP); Koichi Kataoka, Osaka (JP)

(73) Assignee: NIPPON PILLAR PACKING CO., LTD., Osaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/459,776

(22) Filed: Aug. 14, 2014

(65) Prior Publication Data

US 2015/0054225 A1 Feb. 26, 2015

(30) Foreign Application Priority Data

Aug. 21, 2013 (JP) ................................. 2013-171497

(51) Int. Cl.
*F16J 15/22* (2006.01)
*F16J 15/18* (2006.01)

(52) U.S. Cl.
CPC ................. *F16J 15/22* (2013.01); *F16J 15/181* (2013.01)

(58) Field of Classification Search
CPC .................................. F16J 15/20; F16J 15/22
See application file for complete search history.

(56) References Cited

U.S. PATENT DOCUMENTS

| 5,419,568 | A  | * | 5/1995 | Champlin | 277/529 |
| 5,730,922 | A  | * | 3/1998 | Babb et al. | 264/258 |
| 2005/0142969 | A1 | * | 6/2005 | Yu et al. | 442/181 |
| 2006/0148961 | A1 | * | 7/2006 | Schmaucks | 524/492 |
| 2012/0015184 | A1 | * | 1/2012 | Endo et al. | 428/364 |
| 2014/0026303 | A1 | * | 1/2014 | Zhu | 2/458 |

FOREIGN PATENT DOCUMENTS

| JP | 59-68387 | 4/1984 |
| JP | 9-78375 | 3/1997 |
| JP | 11-217723 | 8/1999 |
| JP | 2013-067920 | 4/2013 |

* cited by examiner

*Primary Examiner* — Gilbert Lee
(74) *Attorney, Agent, or Firm* — Rankin, Hill & Clark LLP

(57) ABSTRACT

A gland packing having required characteristics is obtained by finding relationships between required characteristics and the value of the limiting oxygen index, and adequately defining the level of the required characteristics. The gland packing is configured by twisting or braiding a single or plurality of yarns that are formed by twisting fibers having a limiting oxygen index (LOI) of 21 to 30, preferably 22 to 26. The fibers contain fibers in which a flat ratio is defined as 1.1 to 4, the flat ratio being a value which is obtained by dividing the maximum value of an interval between two parallel straight lines in a state where a section of each of the fibers is interposed between the straight lines, by the minimum value. The fibers contain fibers in each of which a sectional shape has one or more recesses having a depth of 0.4 μm or more.

18 Claims, 9 Drawing Sheets

$a / b = f$ $1.1 \leq f \leq 4$

Fig. 7

| LOI e | TORQUE N·m | LEAKAGE AMOUNT cc/min |
|---|---|---|
| 19 | 3.6 | — |
| 20 | 2.6 | 30 |
| 21 | 1.8 | — |
| 22 | 1.3 | 20 |
| 23 | 1.0 | — |
| 24 | 1.1 | — |
| 25 | 1.0 | 40 |
| 26 | 0.9 | 45 |
| 27 | 1.0 | 80 |
| 30 | — | 250 |
| 40 | — | 340 |
| 50 | — | 365 |

Fig. 9

| f | IMPREGNATION RATIO ($\tau$) % | STRESS RELAXATION ($\sigma$) % |
|---|---|---|
| 1.0 | 12 | 9 |
| 1.1 | 31 | 10 |
| 1.2 | 40 | 8 |
| 1.4 | 45 | 9 |
| 1.6 | 47 | 13 |
| 1.8 | 48 | 15 |
| 2.0 | 50 | 19 |
| 2.2 | 50 | 30 |
| 2.4 | 48 | 36 |
| 2.6 | 50 | 38 |
| 2.8 | 49 | 39 |

GLAND PACKING

TECHNICAL FIELD

The present invention relates to a gland packing which is to be used as a sealing component for a fluid apparatus such as a pump or a valve.

BACKGROUND ART

As a conventional art relating to a gland packing which is to be used in a shaft seal part of a fluid apparatus such as a pump or a valve, and a yarn used in the packing, well known is a technique in which expanded graphite is used as disclosed in Patent Literature 1. Expanded graphite has advantages that it is excellent in flexibility and chemical resistance, high in adhesiveness, and durable at high temperature, but also has drawbacks that it has a very low tensile strength, and is brittle and easy to break.

Therefore, a yarn formed by fibers which are high in strength and wear resistance, and a gland packing in which such a yarn is twisted or braided into a cord-like shape are produced. For example, fiber products are known which are disclosed in Patent Literatures 2 and 3, and in which acrylic fiber are used. In addition to acrylic fibers and modacrylic fibers, other various fibers such as rayon, cellulose, hemp, cotton, and polyvinyl alcohol may be used as organic fibers which are useful in such fiber products.

Organic fibers have various features depending on the material, such as high strength and wear resistance, low thermal resistance and hygroscopicity, excellent resistance to high temperature and chemical resistance, low resistance to ultra violet light, and high power of resistance. Therefore, it is requested to select fibers made of a material suitable for the purpose.

Namely, fibers (organic fibers) forming a yarn are requested to reduce to some extent friction (friction coefficient) which is critical in sliding between a gland packing and a shaft of a fluid apparatus such as a pump, or to have flexibility which is important in compatibility with a gland portion or a shaft.

As a factor indicating the characteristics of fibers which are requested to have various characteristics, there is the limiting oxygen index (LOI), as disclosed in Patent Literature 4. The limiting oxygen index is one of methods of evaluating the ease of burning of a material such as plastics or fibers. While changing the ratio of "nitrogen molecules/oxygen molecules" of the air, the oxygen concentration of the limit of causing ignition, i.e., the limiting oxygen index (LOI) is obtained.

PRIOR ART LITERATURE

Patent Literature

[Patent Literature 1]: Japanese Patent Application Laid-Open No. 59-068387

[Patent Literature 2]: Japanese Patent Application Laid-Open No. 11-217723

[Patent Literature 3]: Japanese Patent Application Laid-Open No. 09-078375

[Patent Literature 4]: Japanese Patent Application Laid-Open No. 2013-067920

SUMMARY OF THE INVENTION

Problems to be Solved by the Invention

Therefore, it is a main object of the invention to enable a more preferred gland packing having required characteristics to be obtained by, when a gland packing using a yarn formed by fibers such as organic fibers is constructed, finding relationships between the required characteristics and the value of the limiting oxygen index, and adequately defining the level of the required characteristics. It is a further object of the invention to improve the sectional shape of fibers, thereby enabling the preferred characteristics to be stably attained.

Means for Solving the Problems

The first invention is characterized in that, in a gland packing, the gland packing is configured by twisting or braiding a single or plurality of yarns Y which are formed by twisting fibers s having a limiting oxygen index of 21 to 30, and the fibers s contain fibers in which a flat ratio f is defined as 1.1 to 4, the flat ratio being a value which is obtained by dividing a maximum value a of an interval between two parallel straight lines L1, L2 in a state where a section of each of the fibers is interposed between the straight lines L1, L2, by a minimum value b.

The second invention is characterized in that, in the gland packing of the first invention, the fibers s contain fibers in each of which a sectional shape has one or more recesses 1.

The third invention is characterized in that, in the gland packing of the second invention, a depth h of the recess 1 is 0.4 μm or more.

The fourth invention is characterized in that, in the gland packing of any one of the first to third inventions, the fibers s contain modacrylic fibers.

The fifth invention is characterized in that, in the gland packing of the fourth invention, the modacrylic fibers are acrylonitrile-vinyl acetate copolymer fibers.

The sixth invention is characterized in that, in the gland packing of any one of the first to fifth inventions, the limiting oxygen index is 22 to 26.

Effects of the Invention

According to the first invention, since the limiting oxygen index of the fibers is 21 or more, the friction coefficient can be reduced. In a gland packing which is formed by using the yarn, therefore, it is possible to obtain an advantage that friction with a slide member such as a shaft is small.

Since the limiting oxygen index of the fibers is 30 or less, furthermore, the yarn is highly flexible. In a gland packing which is formed by using the yarn, therefore, the conformability with the slide member such as a shaft is improved, and there is an advantage that it is possible to attain an excellent sealing property in which less leakage occurs.

According to the first invention, a gland packing configured by twisting or braiding yarns formed by twisting fibers of a flat ratio f of f≥1.1 can easily hold an impregnating material, and a gland packing formed by using fibers of f≤4 can sufficiently reduce stress relaxation, and ensure and maintain stress required for sealing.

When fibers in which 1.1≤f≤4 exist, therefore, it is possible to clearly attain the above-described effects, i.e., v "impregnating material can be easily held" and z "stress required for sealing can be ensured and maintained".

As a result, in the case where a gland packing is to be constructed by twisting or braiding yarns formed by fibers such as organic fibers, when relationships between the required characteristics and the value of the limiting oxygen index are found, the level of the required characteristics is adequately defined, and the sectional shape of the fibers is improved, it is possible to provide a gland packing having required characteristics.

When the limiting oxygen index is 22 to 26 as in the sixth invention, it is possible to provide a gland packing in which the effect due to the configuration of the first invention can be further enhanced.

According to the second invention, since fibers having one or more recesses exist, an impregnating material can be held by the recesses. The gland packing is configured by using yarns formed by using fibers containing 50% or more of the fibers each having one or more recesses, and therefore it is possible to provide a gland packing which can substantially provide the advantage that an impregnating material can be held.

A configuration where fibers each having one or more recesses exist in 50% or more is preferable because the above-described effect, i.e., w "impregnating material can be held" can be clearly attained.

In this case, a configuration where the depth of the recess is 0.4 μm or more as in the third invention is preferable from the viewpoint that the impregnating material can be easily held.

As fibers to be used, fibers which have modacrylic fibers as in the fourth invention are preferable. A configuration where the modacrylic fibers are acrylonitrile-vinyl acetate copolymer fibers as in the fifth invention is advantageous.

BRIEF DESCRIPTION OF THE DRAWINGS

FIG. 7 is a table showing results of a leakage test and a friction test.

FIG. 9 is a table showing relationships among the flat ratio, the impregnation ratio, and stress relaxation.

DESCRIPTION OF PREFERRED EMBODIMENTS

Hereinafter, embodiments of the gland packing of the invention will be described with reference to the drawings. In the following description, the limiting oxygen index is abbreviated as "LOI".

[Embodiment 1]

The gland packing of the invention is characterized in that the gland packing is configured by twisting or braiding a single or plurality of yarns formed by twisting fibers having an LOI of 21 to 30, and the fibers s contain those in which the flat ratio f is defined as 1.1 to 4, the flat ratio being a value which is obtained by dividing the maximum value a of the interval between two parallel straight lines L1, L2 in a state where a section of each of the fibers is interposed between the straight lines L1, L2, by the minimum value b.

In Embodiment 1, the value e of the LOI of the fibers is $21 \leq e \leq 30$, and the flat ratio f is $1.1 \leq f \leq 4$.

First, examples of fibers having an LOI value e of $21 \leq e \leq 30$ are acrylic fibers, modacrylic fibers, rayon, cellulose, hemp, cotton, and polyvinyl alcohol.

Acrylic fibers include those formed by a polymer containing 50 wt. % or more of acrylonitrile. The polymer may be a copolymer of acrylonitrile and an unsaturated monomer which is copolymerizable with acrylonitrile, as far as the polymer contains 50 wt. % or more of acrylonitrile.

Examples of the unsaturated monomer which is copolymerizable with acrylonitrile are: an acrylic eater such as methyl acrylate, ethyl acrylate, isopropyl acrylate, n-butyl acrylate, 2-ethylhexyl acrylate, 2-hydroxyethyl acrylate, and hydroxypropyl acrylate; a methacrylic ester such as ethyl methacrylate, isopropyl methacrylate, n-butyl methacrylate, isobutyl methacrylate, t-butyl methacrylate, n-hexyl methacrylate, cyclohexyl methacrylate, lauryl methacrylate, 2-hydroxyethyl methacrylate, hydroxypropyl methacrylate, and diethylaminoethyl methacrylate; and an unsaturated monomer such as acrylic acid, methacrylic acid, maleic acid, itaconic acid, acrylamide, N-methylolacrylamide, diacetoneacrylamide, styrene, vinyl toluene, vinyl acetate, vinyl chloride, vinylidene chloride, vinyl bromide, vinylidene bromide, vinyl fluoride, and vinylidene fluoride.

Moreover, a monomer which is to be copolymerized is psulfophenyl methallylether, methallylsulfonate, allylsulfonate, styrenesulfonate, 2-acrylamide-2-methylpropanesulfonic acid, their alkali metal salts, and or like.

In adjustment of the LOI value e of the fibers, means for exposing the fibers in an air atmosphere at a temperature of 200 to 400° C. for 1 to 10 hours may be used.

Next, the flat ratio of a fiber will be described.

Figure 1:
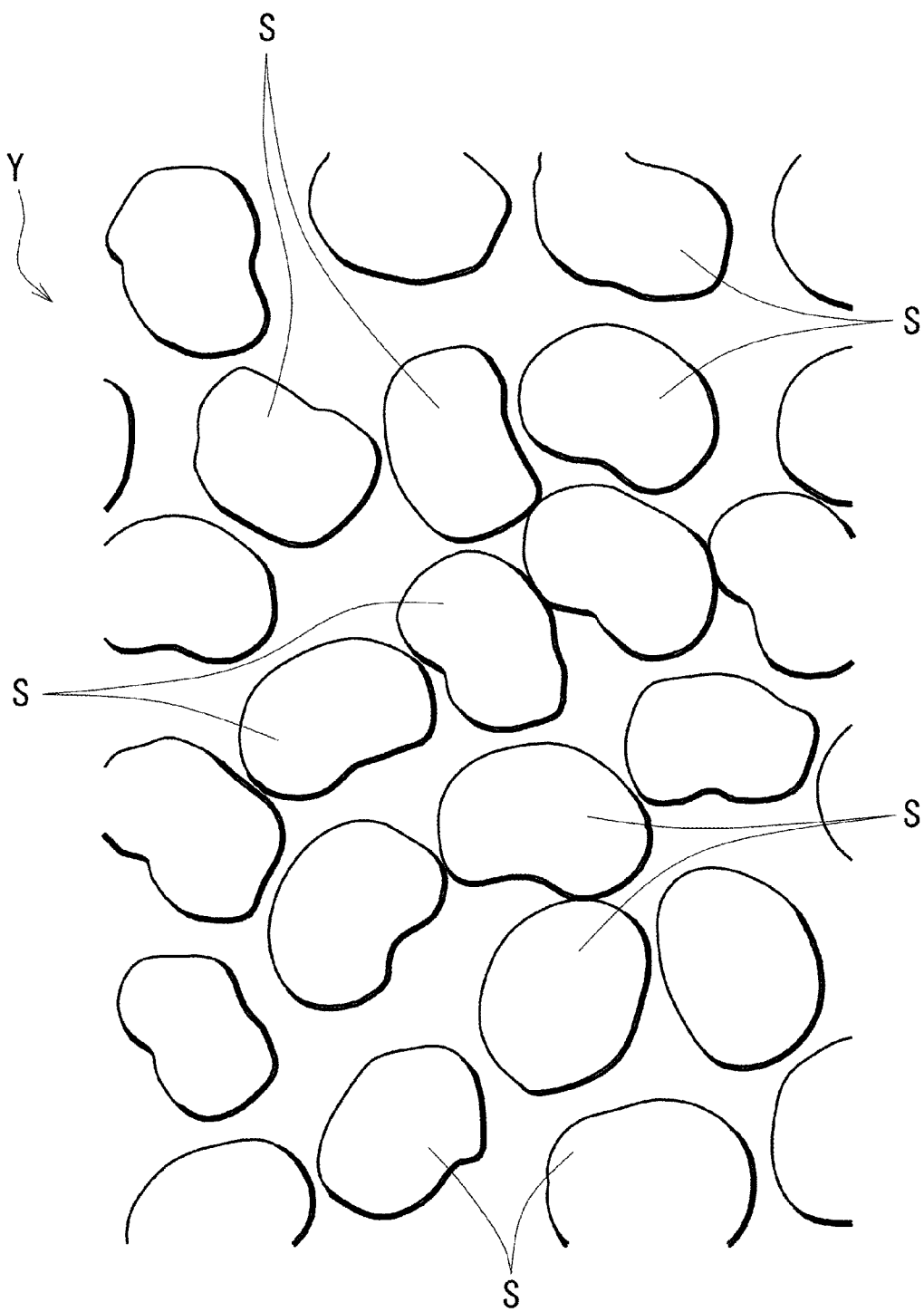
FIG. 1 is a sectional view showing sectional shapes of single fibers.
Figure 2:
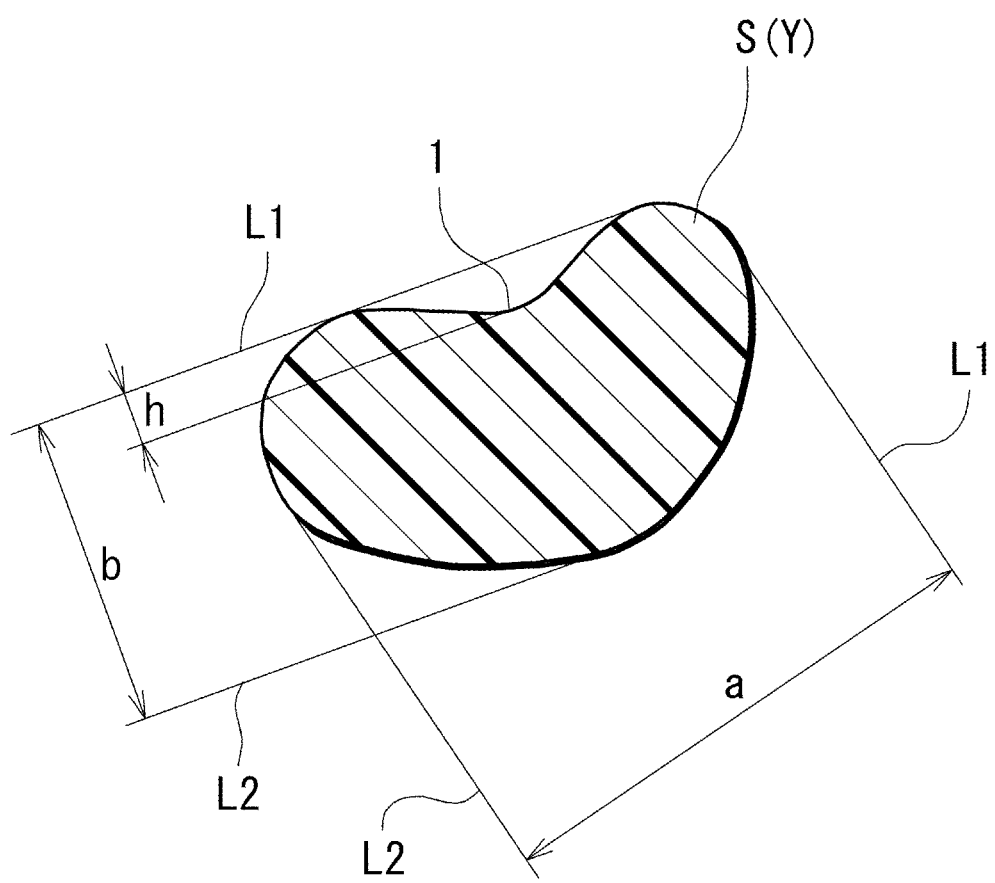
FIG. 2 is a view showing a sectional shape and flat ratio of a fiber.

As described above, the fibers (single fibers) a forming the yarn of Embodiment 1 contain those in which the flat ratio f is defined as 1.1 to 4, the flat ratio being a value which is obtained by dividing the maximum value a of the interval between two parallel straight lines L1, L2 in a state where a section of each of the fibers is interposed between the straight lines L1, L2, by the minimum value b (see FIGS. 1 and 2).

In the case of a fiber s having a kidney-shaped sectional shape shown in FIG. 2, namely, the maximum value among intervals between two parallel straight lines L1, L2 is a, and the minimum value is b. In this case, the flat ratio is $f=(a/b)$.

When fibers having a flat ratio f of $1.1 \leq f \leq 4$ exist, it is possible to attain the above-described effects v and z, and, when fibers in which $1.1 \leq f \leq 4$ exist in 50% or more, it is preferable because the effects v and z can be clearly attained.

In the case where the number of fibers forming a yarn Y is 100, for example, the fibers contain 50 or more fibers in which the flat ratio f is $1.1 \leq f \leq 4$.

The fibers (single fibers) s forming the yarn contain those in which a sectional shape has one or more recesses 1 (having a kidney-like shape) as shown in FIG. 2. When fibers having one or more recesses 1 exist, it is possible to substantially attain the effect w. A configuration where fibers having one or more recesses exist in 50% or more is preferable because the effect w can be clearly attained.

A configuration where two or more recesses 1 exist, such as that where the sections of the fibers a have a gourd-like shape may be possible. Preferably, the depth h of the recess 1 shown in FIG. 2 is $h \geq 0.4$ μm from the viewpoint that an impregnating material is effectively held by the recesses 1. A configuration being $h \geq 0.6$ μm is more preferable.

Although not illustrated, in fibers having a sectional shape in which a recess is not formed, the flat ratio f is $1.0 \leq f \leq 1.7$, and the sectional shape is formed only by curved lines. In fibers having a sectional shape in which, for example, one or more kidney-shaped recesses are formed, the flat ratio f is $1.1 \leq f \leq 4$. In many of such fibers, the flat ratio f was $1.2 \leq f \leq 1.7$.

The sections of the fibers (single fibers) a have a diameter of 17±3 μm, and a length of 128±20 μm. The fibers have a fineness of 2 deniers. In a single yarn obtained by spinning fibers, the weight due to a first twist of 90 turns per meter is 0.14 g/m. In a yarn obtained by twisting three single fibers, the weight due to a final twist of 40 turns per meter is 0.43 g/m. A cord-like gland packing (braided packing) is formed by square knitting using eight yarns, circular knitting using sixteen yarns, lattice knitting using thirty-two yarns, or the like.

The impregnation process is performed as follows. A cord-like gland packing (braided packing) of the invention is immersed in an aqueous dispersion of a fluorine resin, and drawn up after a predetermined number of hours, and dried. The impregnation rate τ can be expressed by:

$$\tau = \{(x-y)/x\} \times 100 \text{(unit: \%)}$$

where x indicates the weight after the impregnation, and y indicates the weight before the impregnation. The impregnation rate in the embodiment was τ=45% to 50%.

After the impregnation, a hydrocarbon lubricant may be similarly impregnated.

(Apparatus and Method of Leakage Test, and Results)

Figure 3:
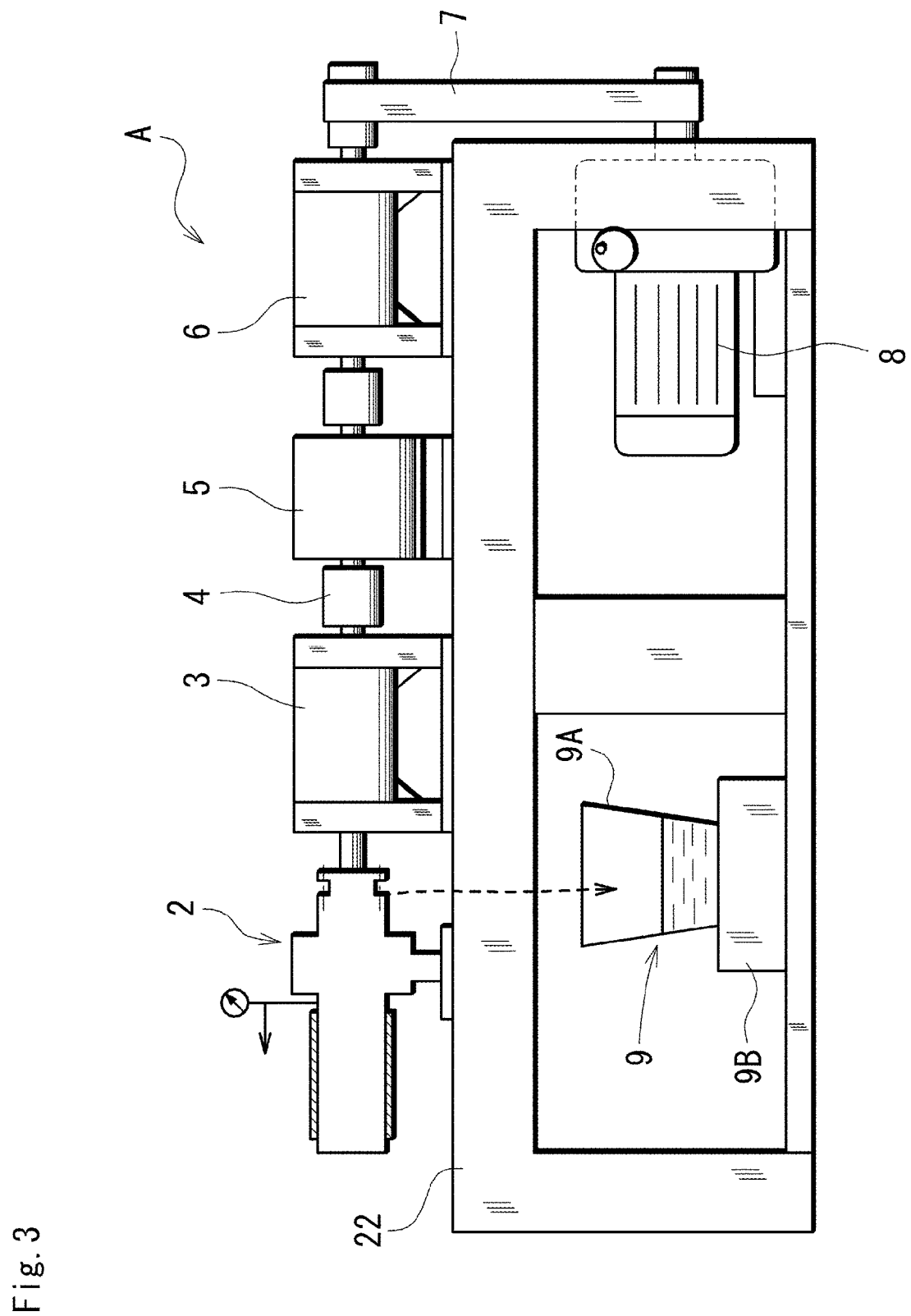
FIG. 3 is a diagram showing the configuration of a leakage testing apparatus.

FIG. 3 shows a leakage testing apparatus A. The leakage testing apparatus A is configured by arranging a leakage testing unit 2, a bearing 3, a rotary joint 4, a torque detecting unit 5, a bearing 6, a transmission belt 7, an electric motor 8, a leakage measuring unit 9, and the like in a test frame 22 as shown in the figure.

Figure 4:
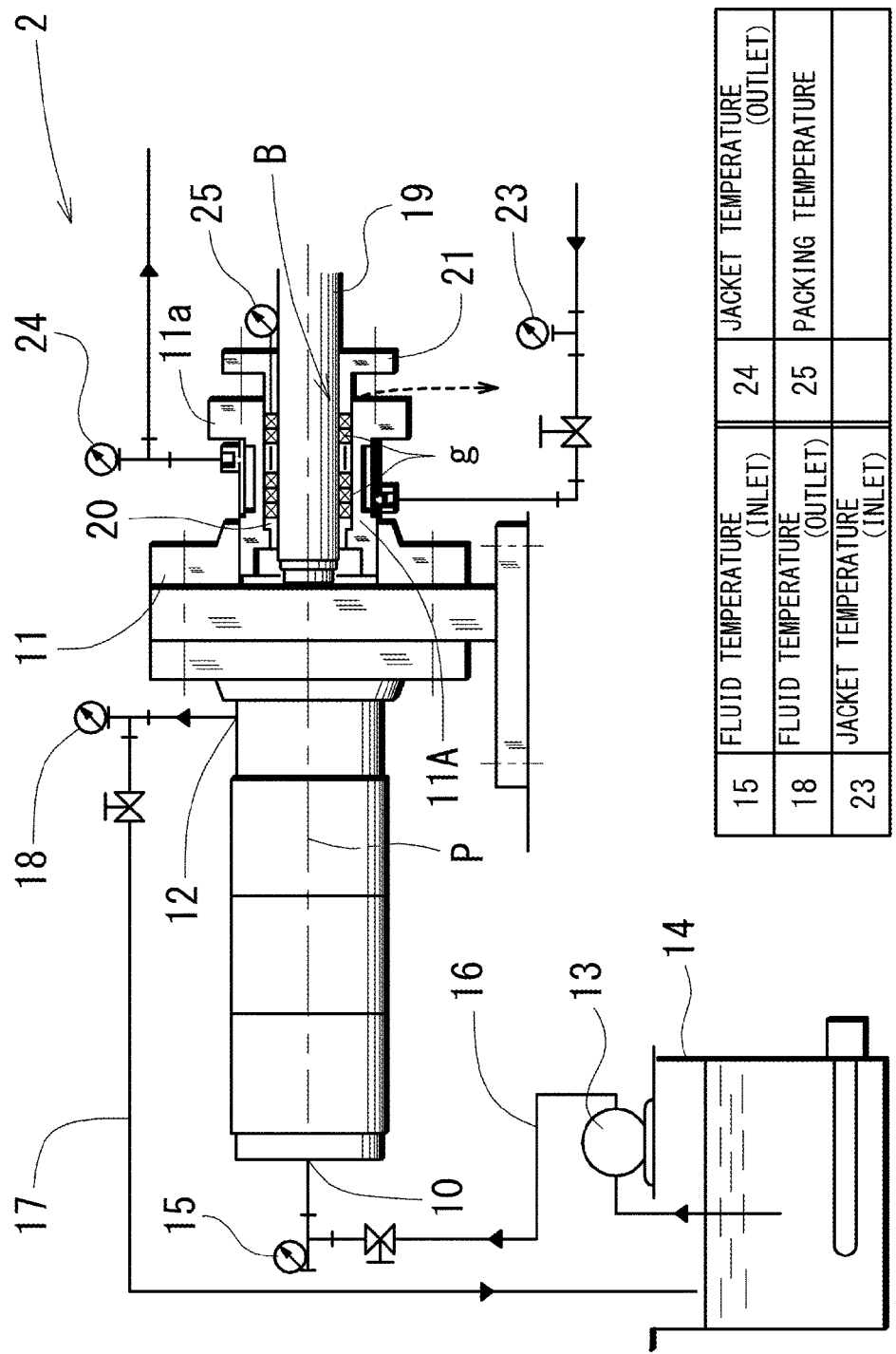
FIG. 4 is a detail view of a leakage testing unit in FIG. 3.

As shown in FIG. 4, the leakage testing unit 2 has a fluid inlet 10, a seal box 11 including a sealing device B, a fluid outlet 12, etc. The reference numeral 13 denotes a pump connected in a supply flow path 16 through which a fluid (water or the like) in a tank 14 is supplied to the fluid inlet 10.

A first thermometer 15 which measures the fluid temperature on the inlet side of the fluid which is to be sealed is disposed in the supply flow path 16. A second thermometer 18 which measures the fluid temperature on the outlet side of the fluid is disposed in a discharge flow path 17 which extends from the fluid outlet 12 to the tank 14.

As shown in FIG. 3, the leakage measuring unit 9 has a reservoir vessel 9A which can receive and reserve a fluid leaking from the sealing device B, and a weighing device 9B which weighs the weight of the leaking fluid together with that of the reservoir vessel. The broken lines which are drawn vertically downward in FIGS. 3 and 4 indicate diagrammatically the falling path of the leakage fluid.

The sealing device B has a usual configuration. Namely, a receiving member 20, a plurality of gland packings g, and a packing gland 21 are inserted into a cylindrical space defined by a gland portion 11A of the seal box 11 and a rotation shaft 19. The packing gland 21 is fastened to a flange 11a of the gland portion 11A by bolts which are not shown, whereby the plurality of gland packings g are pressed in the axial direction P to seal the interface between the gland portion 11A and the rotation shaft 19.

The reference numeral 23 denotes a third thermometer which measures the temperature of the jacket on the inlet side of the fluid to be sealed, and 24 denotes a fourth thermometer which measures the temperature of the jacket on the outlet side of the fluid to be sealed. Also a fifth thermometer 25 which measures the temperature (packing temperature) of the gland packings g is disposed.

The leakage test method using the leakage testing apparatus A is performed in the following manner. One set of five gland packings g (1 set of 5 rings) having an inner diameter of 100 mm, an outer diameter of 129 mm, and a height of 14.5 mm is installed in the gland portion 11A of the leakage testing apparatus A simulating a pump. Fresh water (fluid to be sealed) at a pressure of 0.5 MPa is applied to the gland portion 11A, and the rotation shaft 19 is rotated at 1,900 rpm. The fastening bolts for the packing gland 21 are adjusted so that the temperature of the gland portion 11A in the vicinity of the gland packings g is 40° C. The temperature is measured by the fifth thermometer 25. The leakage measuring unit 9 records the leakage amount after an elapse of about six hours from a timing when the leakage amount is not changed and becomes constant.

[Stress Relaxation Test]

Figure 5:
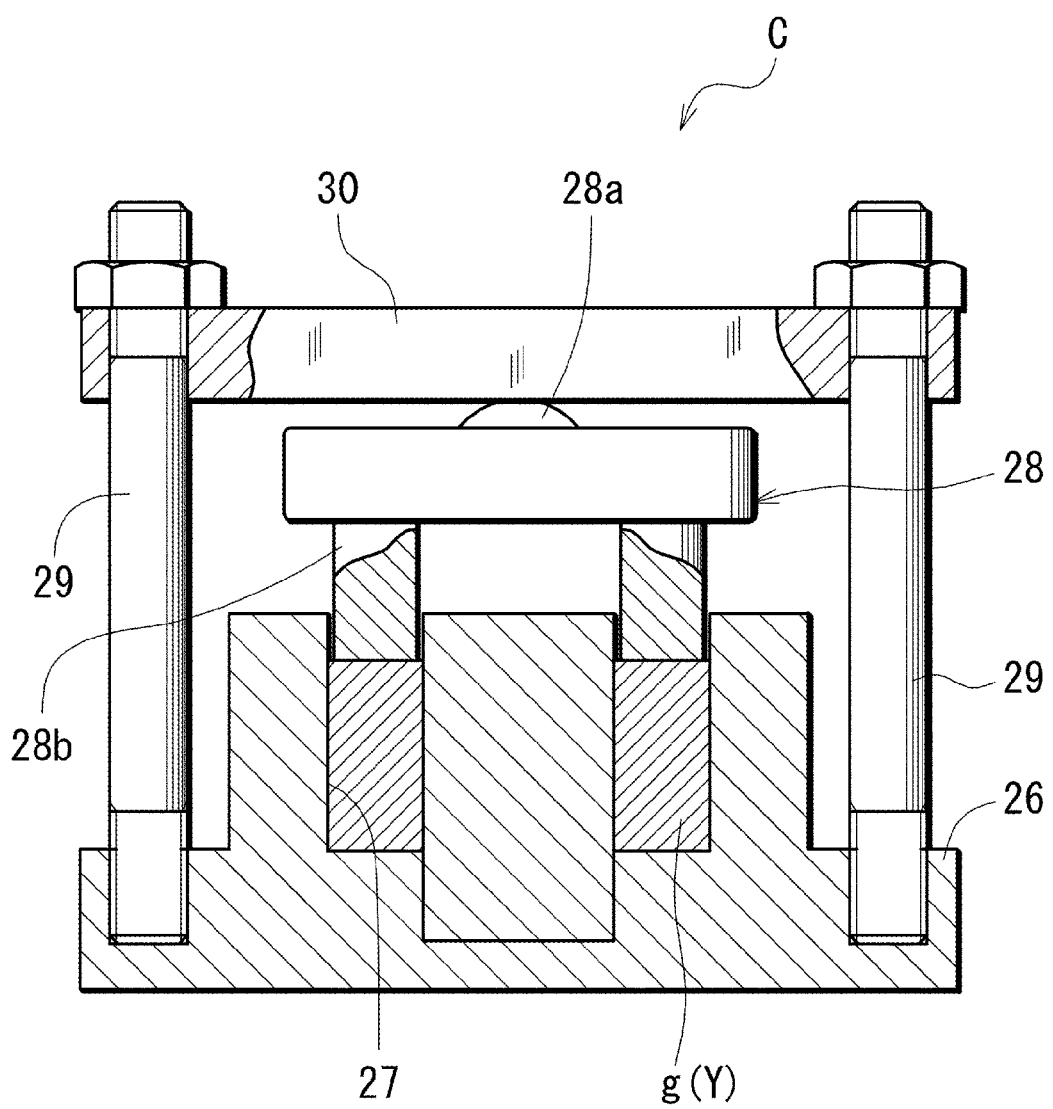
FIG. 5 is a diagram showing a stress relaxation testing apparatus.

With respect to stress relaxation of the gland packing g, the stress relaxation testing apparatus C shown in FIG. 5 is used. The stress relaxation testing apparatus C has an apparatus frame 26 including a packing mounting portion 27 into which the gland packing g is to be mounted, a packing pressing portion 28, pressing bolts 29, etc.

The apparatus has a structure where an upper portion 28a of the packing pressing portion 28 is in spherical contact with a pressing plate 30 which lays between the plurality of pressing bolts 29, and a single or plural gland packings g mounted in the annular packing mounting portion 27 are pressed via an annular pressing portion 28b.

One set of five gland packings g (1 set of 5 rings) having an inner diameter of 100 mm, an outer diameter of 129 mm, and a height of 14.5 mm is installed in the annular packing mounting portion 27, the packings are fastened by operating the pressing bolts 29 to set the fastening stress (initial fastening stress) p on the gland packings g to p=2 N/mm², and the residual stress after 24 hours is measured.

The stress relaxation rate a is expressed by:

$$\sigma = p - q/p$$

where q indicates the fastening stress after 24 hours.

[Friction Testing Apparatus]

A friction testing apparatus D for the gland packing g will be briefly described.

Figure 6:
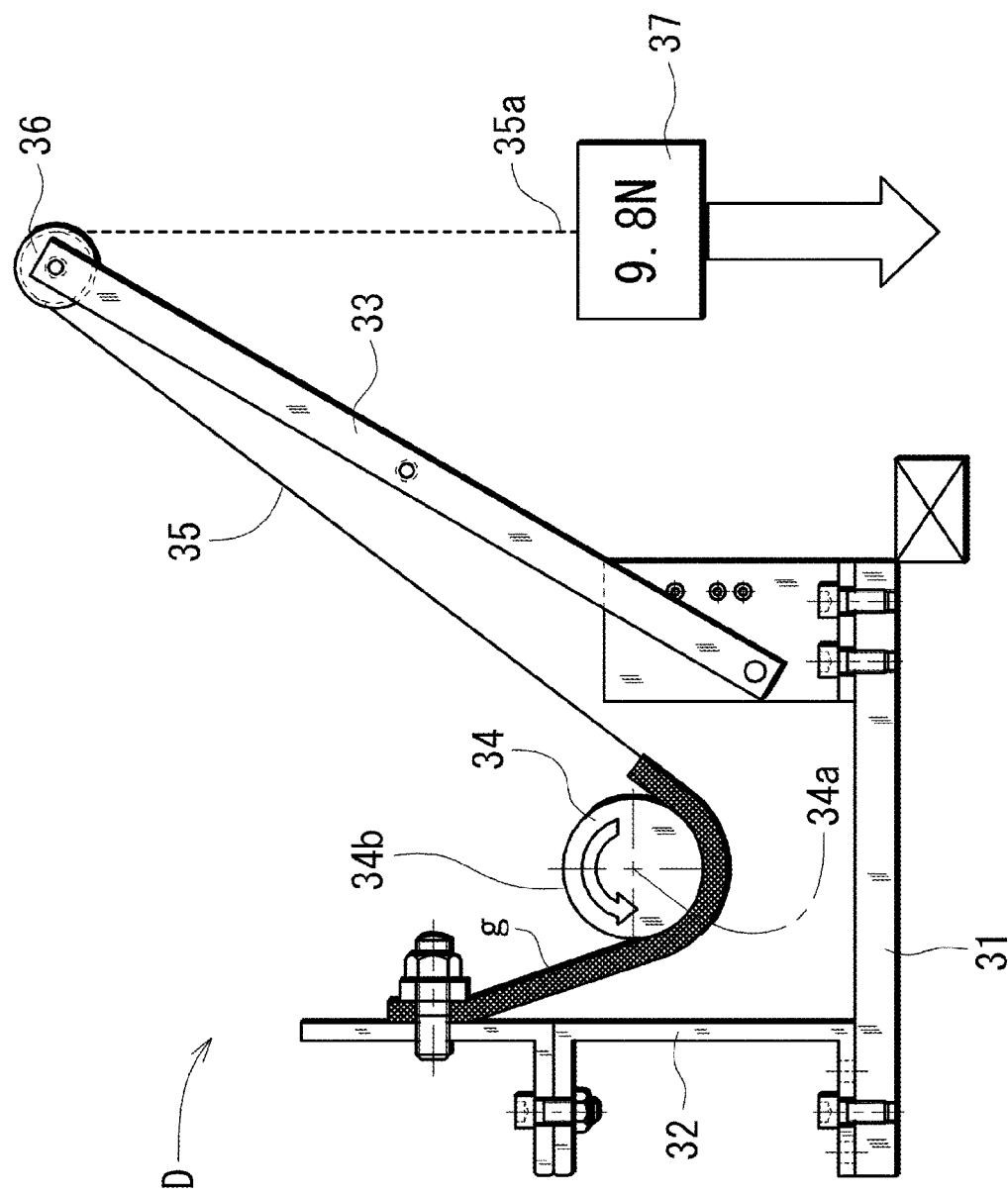
FIG. 6 is a diagram showing a friction testing apparatus.

In the friction testing apparatus D, as shown in FIG. 6, a support frame 32 and an arm 33 stand on a test frame 31. A cylinder-like rotary drum (rotation shaft) 34 which is made of a metal such as stainless steel is pivoted between the frame 32 and the arm 33, thereby configuring the friction testing apparatus D. The rotary drum 34 can be rotationally driven about an axis 34a in the direction of the arrow (hollow arrow) in figure by a driving source which is not shown.

One end of the gland packing g having, for example, a square cord-like shape is fixed to an upper portion of the support frame 32, and the other end is passed over and wound around the lower side of the rotary drum 34, and then lifted up. A cord 35 is connected to the lifted-up other end of the gland packing g. The cord 35 is wound around a pulley 36 pivoted to an upper end portion of the arm 33, and a weight 37 is attached to the other end 35a of the cord which is vertically hung. Namely, the gland packing g is relatively rubbed against the rotary drum 34 in the state where the gland packing is pressed against the surface 34a of the rotary drum 34 with a certain degree of force.

EXAMPLES

As the fibers s to be used in the yarn Y for the gland packing g, acrylic fibers or modacrylic fibers are used. The fibers have a diameter of 18 (14 to 20) μm. The LOI of the fibers was measured in accordance with JIS K 7201-2 "Plastics—Determination of burning behaviour by oxygen index—Part 2: Ambient-temperature test".

First, the plurality of fibers are twisted to produce the yarn Y. Next, a cord-like gland packing g is produced by eight-strand square braiding in which eight yarns Y are used, or sixteen-strand circular braiding in which sixteen yarns Y are used, while using a braiding machine (not shown). Alternatively, the gland packing may be produced by twisted cords.

Then, the cord-like gland packing g is formed by using a two-point roll or a four-point roll into a square cord-like gland packing g having a square section in which the length of one side is 14.5 mm. The gland packing is cut into a predetermined length.

Figure 8:
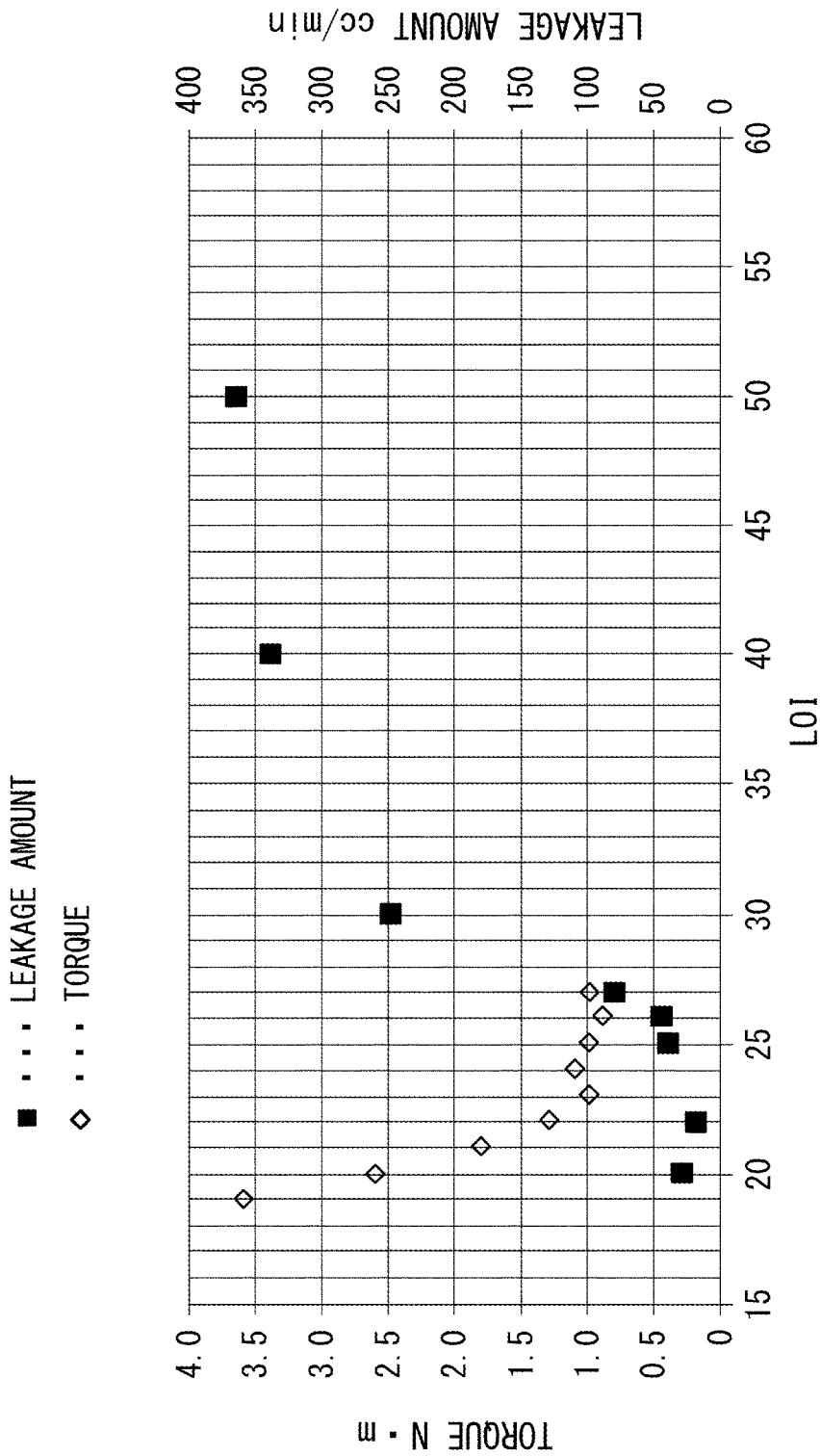
FIG. 8 is a graph illustrating the test results shown in FIG. 7.

Leakage and friction tests are performed by using the thus produced gland packing g to obtain relationships among a leakage amount, a torque, and an LOI value e as shown in FIGS. 7 and 8.

In the friction test, the value of the rotary force, i.e., the torque (torque value) of the rotary drum 34 is measured while the weight 37 is 1 kg, and the rotary drum 34 is rotated at 3,000 rpm. The result is shown in the table of FIG. 7 and the graph of FIG. 8.

With respect to the torque, as seen from FIGS. 7 and 8, in the case of the LOI value e<22, the larger the value e, the smaller the torque value is. In the vicinity of e=22, the change amount of the torque value is small, and, in the case of e≥22, the torque has a substantially constant value.

From the result, it is seen that the gland packing g is obtained in which, in the case of the LOI value e≥22, the friction is small, and the burden on the pump power is small. It is supposed that, as the LOI value e becomes larger, the degree of carbonization of the fibers is more increased, and the friction coefficient against the rotary drum 34 is further reduced.

With respect to the leakage amount, as seen from FIGS. 7 and 8, in the case of the WI value e<27, the leakage amount has a substantially unchanged value, and, in the vicinity of e=27, the leakage amount is slightly increased. It is seen that, in the case of 27≤e<30, the leakage amount shows an increasing trend, and, in the case of e≥30, the leakage amount is largely increased.

From the above, it may be said that the LOI value e is preferably, 21≤e≤30, and more preferably 22≤e≤26.

With respect to the gland packing g which is produced by using yarns formed by twisting fibers of e<21, it has been found that friction (friction coefficient) caused between the gland packing, and a shaft (shaft of a pump) is increased beyond the allowable range.

Furthermore, it has been found that a yarn formed by twisting fibers of e>30 is poor in flexibility. When poor in flexibility, the modulus of elasticity is high. In a gland packing which is formed by using such a yarn, the resulting packing is hardly plastically deformed.

When poor in flexibility, the sectional shape of a square cord-like gland packing is hardly held, and rounded. Moreover, the compatibility with the shaft of the pump is low, and therefore the leakage amount (leakage amount per unit time) is increased.

From the above, with respect to the LOI, friction (friction coefficient) of a yarn formed by twisting fibers of the LOI value e≥21 is sufficiently low, and a gland packing configured by using the yarn has an excellent slidability against a shaft.

In the case of e≥22, it is possible to provide a gland packing having a more excellent slidability.

When the LOI value e of fivers is e≤30, it is possible to form a gland packing having a necessary flexibility. In the case where a square cord-like gland packing is configured, namely, the sectional shape can be held, and prevented from being rounded.

Moreover, the conformability with a shaft of a pump is improved, and it is possible to attain an excellent sealing property in which less leakage occurs.

In the case of e≤26, the gland packing has an adequate flexibility, and the conformability with a portion which is to be sealed, such as a gland portion or rotation shaft of a pump is further improved, and therefore the leakage amount is further reduced.

FIG. 9 shows relationships between the impregnation ratio τ and the stress relaxation rate σ, and the flat ratio f of fibers.

In the case where the flat ratio f is f<1.1, adhesion of an impregnating material for providing the lubricating property and the sealing property (filler material) hardly occurs.

In the case where the flat ratio f is f>4, fibers are excessively flexible. Namely, stress is concentrated at a portion having a small curvature, and fibers are easily plastically deformed. When formed as a gland packing, therefore, stress relaxation is large.

When a gland packing is attached to a gland of a pump and then fastened by a packing gland, namely, stress applied to the gland packing is excessively reduced because of plastic deformation of the gland packing. Therefore, stress in the use of the gland packing is easily relaxed, and stress necessary for sealing cannot be ensured and maintained, whereby a large amount of leakage may be caused.

In the case where the sectional shape does not have the recess 1 (see FIG. 2), fixation of an impregnating material for providing the lubricating property and the sealing property (filler material) hardly occurs.

With respect to the flat ratio f, in a gland packing in which a yarn formed by twisting fibers of f≥1.1 is used, an impregnating material is easily held. In the case of f≥1.2, the easiness of holding of an impregnating material is further improved. In a gland packing in which a yarn formed by twisting fibers of f≤4 is used, stress relaxation can be sufficiently reduced, and stress necessary for sealing can be ensured and maintained. When the sectional shape of a fiber has the recess 1, an impregnating material is easily held by the recess, and therefore this configuration is preferable.

DESCRIPTION OF REFERENCE NUMERALS

1 recess
Y yarn
a maximum value of interval between two straight lines
b minimum value of interval between two straight lines
f flat ratio
h depth of recess
s fiber
L1, L2 two parallel straight line

The invention claimed is:

1. A gland packing wherein the gland packing is configured by twisting or braiding a single or plurality of yarns which are formed by twisting fibers having a limiting oxygen index of 21 to 30, and
    the fibers contain fibers in which a flat ratio f is defined as 1.1 to 4, the flat ratio being a value which is obtained by dividing a maximum value of an interval between two parallel straight lines in a state where a section of each of the fibers is interposed between the straight lines, by a minimum value.

2. The gland packing according to claim 1, wherein the fibers contain fibers in each of which a sectional shape has one or more recesses.

3. The gland packing according to claim 2, wherein a depth of the recess is 0.4 μm or more.

4. The gland packing according to claim 3, wherein the fibers contain modacrylic fibers.

5. The gland packing according to claim 4, wherein the modacrylic fibers are acrylonitrile-vinyl acetate copolymer fibers.

6. The gland packing according to claim 5, wherein the limiting oxygen index is 22 to 26.

7. The gland packing according to claim 4, wherein the limiting oxygen index is 22 to 26.

8. The gland packing according to claim 3, wherein the limiting oxygen index is 22 to 26.

9. The gland packing according to claim 2, wherein the fibers contain modacrylic fibers.

10. The gland packing according to claim 9, wherein the modacrylic fibers are acrylonitrile-vinyl acetate copolymer fibers.

11. The gland packing according to claim 10, wherein the limiting oxygen index is 22 to 26.

12. The gland packing according to claim 9, wherein the limiting oxygen index is 22 to 26.

13. The gland packing according to claim 2, wherein the limiting oxygen index is 22 to 26.

14. The gland packing according to claim 1, wherein the fibers contain modacrylic fibers.

15. The gland packing according to claim 14, wherein the modacrylic fibers are acrylonitrile-vinyl acetate copolymer fibers.

16. The gland packing according to claim 15, wherein the limiting oxygen index is 22 to 26.

17. The gland packing according to claim 14, wherein the limiting oxygen index is 22 to 26.

18. The gland packing according to claim 1, wherein the limiting oxygen index is 22 to 26.

* * * * *